US007555480B2

(12) United States Patent
Zhang et al.

(10) Patent No.: US 7,555,480 B2
(45) Date of Patent: Jun. 30, 2009

(54) COMPARATIVELY CRAWLING WEB PAGE DATA RECORDS RELATIVE TO A TEMPLATE

(75) Inventors: Benyu Zhang, Beijing (CN); Chenxi Lin, Beijing (CN); Hua-Jun Zeng, Beijing (CN); Jian Wang, Beijing (CN); Ke Tang, Beijing (CN); Zheng Chen, Beijing (CN)

(73) Assignee: Microsoft Corporation, Redmond, WA (US)

( * ) Notice: Subject to any disclaimer, the term of this patent is extended or adjusted under 35 U.S.C. 154(b) by 260 days.

(21) Appl. No.: 11/456,753

(22) Filed: Jul. 11, 2006

(65) Prior Publication Data

US 2008/0016087 A1    Jan. 17, 2008

(51) Int. Cl.
G06F 17/30 (2006.01)
G06F 17/00 (2006.01)
G06F 12/00 (2006.01)
G06F 3/048 (2006.01)

(52) U.S. Cl. .............................. 707/5; 705/26; 706/12; 715/257; 715/838

(58) Field of Classification Search ................ 707/5, 707/10, 100
See application file for complete search history.

(56) References Cited

U.S. PATENT DOCUMENTS

| 5,701,467 | A | * | 12/1997 | Freeston .................. 707/100 |
| 5,903,892 | A | * | 5/1999 | Hoffert et al. ................ 707/10 |
| 6,073,135 | A | * | 6/2000 | Broder et al. .............. 707/100 |
| 6,282,549 | B1 | * | 8/2001 | Hoffert et al. ............ 707/104.1 |
| 6,370,543 | B2 | * | 4/2002 | Hoffert et al. ............ 707/104.1 |
| 6,792,605 | B1 | * | 9/2004 | Roberts et al. .............. 719/313 |
| 6,880,008 | B1 | * | 4/2005 | Yoneda ...................... 709/226 |
| 6,996,572 | B1 | * | 2/2006 | Chakrabarti et al. ........ 707/102 |
| 7,073,122 | B1 | * | 7/2006 | Sedghi ..................... 715/234 |
| 7,313,555 | B2 | * | 12/2007 | Klier ............................ 707/6 |
| 2002/0103876 | A1 | | 8/2002 | Chatani et al. |
| 2002/0111967 | A1 | * | 8/2002 | Nagase ...................... 707/513 |
| 2003/0115545 | A1 | * | 6/2003 | Hull et al. .................. 715/500 |
| 2003/0145014 | A1 | * | 7/2003 | Minch ........................ 707/100 |
| 2003/0208689 | A1 | * | 11/2003 | Garza ........................ 713/201 |
| 2004/0148568 | A1 | * | 7/2004 | Springer ..................... 715/513 |
| 2004/0191746 | A1 | * | 9/2004 | Maron et al. ................ 434/323 |

(Continued)

FOREIGN PATENT DOCUMENTS

EP    1158423 A2    11/2001

(Continued)

OTHER PUBLICATIONS

Gibson, et al., "The Volume and Evolution of Web Page Templates" May 10, 2005, World Wide Web Conference WWW' 05, ACM Press, p. 830-839.*

(Continued)

*Primary Examiner*—Hosain T Alam
*Assistant Examiner*—Joseph D Wong
(74) *Attorney, Agent, or Firm*—Lee & Hayes, PLLC (57) ABSTRACT

The invention provides a method of interactively crawling data records on a web page. Users may select various data records of interest on a web page to generate templates to search for similar data items on the same web page or on different web pages. A tree matching algorithm may be used to compare and extract data matching the generated template.

11 Claims, 9 Drawing Sheets

U.S. PATENT DOCUMENTS

| | | | |
|---|---|---|---|
| 2004/0249856 A1 | 12/2004 | Garden et al. | |
| 2005/0234997 A1* | 10/2005 | Gu et al. | 707/104.1 |
| 2006/0088356 A1* | 4/2006 | Jawerth et al. | 400/472 |
| 2006/0111971 A1* | 5/2006 | Salesin et al. | 705/14 |
| 2006/0155751 A1* | 7/2006 | Geshwind et al. | 707/102 |
| 2007/0083808 A1* | 4/2007 | Setlur et al. | 715/513 |
| 2007/0156677 A1* | 7/2007 | Szabo | 707/5 |
| 2007/0214133 A1* | 9/2007 | Liberty et al. | 707/5 |
| 2007/0226229 A1* | 9/2007 | Psounis et al. | 707/10 |
| 2008/0010291 A1* | 1/2008 | Poola et al. | 707/10 |
| 2008/0010292 A1* | 1/2008 | Poola | 707/10 |

FOREIGN PATENT DOCUMENTS

| | | | |
|---|---|---|---|
| KR | 10-2001-0105842 A | 11/2001 | |

OTHER PUBLICATIONS

Damerau, "A Technique for Computer Detection and Correction of Spelling Errors", Mar. 1964, Communications of the ACM, vol. 7, No. 3, p. 171-176.*

Navarro, "A Guided Tour to Approximate String Matching", Mar. 2001, ACM Computing Surveys, p. 31-88.*

Crescenzi et al, "Automatic Information Extraction from Large Websites", Sep. 2004, Journal of the ACM, p. 731-779.*

Gilleland, "Levenschtein Distnace, in Three Flavors", Jul. 2004, <Retrieved from web.archive.org/20050707000924/http://www.merriampark.com/ld.htm>, p. 1-11.*

Mangnes, "The use of Levenschtein distance in computer forensics", Jun. 5, 2005, MSc Thesis, Gj0vik University College, Norwegian Information Security Laboratory, 98 pages.*

Lindell, "Differential Forms in Electromagnetics", Apr. 2004, Wiley-IEEE Press, p. 3, 219-228.*

Popovici et al, "Information Retrieval of Sequential Data in Heterogeneous XML Databases", Jul. 2005, AMR 2005, LNCS 3877, Springer-Verlag, p. 236-250.*

Zwillinger, "CRC standard mathematical tables and formulae", 2003, 31st Edition, CRC, Chemical Rubber Company, Chapman & Hall, 910 pp., <Browsed via www.mathnetbase.com/books/1129/c2913_fm.pdf on Mar. 19, 2009>.*

Haustein et al, "A model-driven runtime environment for Web applications", Nov. 2005, Software & System Modeling, p. 443-458.*

Bille, "A Survey of Tree Edit Distance and Related Problems", Dec. 2005, p. 1-27.*

International Search Report dtd Jan. 4, 2008, PCT/US2007/015215.

* cited by examiner

ADDRESS  HTTP://WWW.AMAZON.COM/EXEC/OBIDOS    GO

- THE FIRST AMENDMENT PROJECT  DVD  (RATE IT)
- HELLRAISER – DEADER  DVD  (RATE IT)
- THE BROWNING VERSION (CRITERION COLLECTION) DVD ~ MICHAEL REDGRAVE (RATE IT)
- NBA 25 YEARS OF CHAMPIONS DVD (RATE IT)
- FILM NOIR CLASSIC COLLECTION, VOL 2 (BORN TO KILL / CLASH BY NIGHT / CROSSFIRE/DILLINGER (1945) / THE NARROW MARGIN (1952)) DVD ~ CLAIRE TREVOR (RATE IT)

▷ MORE FEATURED DVD'S

COMING SOON
JULY 12
THE NANNY – THE COMPLETE FIRST SEASON
TALES FROM THE CRYPT– THE FIRST SEASON
THE BEST OF THE ORIGINAL MICKEY MOUSE CLUB
JULY 19
DEAD LIKE ME – THE COMPLETE SECOND SEASON
LOST IN SPACE – SEASON 3, VOL 2
ANDROMEDA SEASON 4 WITH BOX

THE HOT LIST: SAVE 35% OR MORE
- SIN CITY
- HITCH
- SEINFELD: SEASON 4
- SEE THE WHOLE LIST

BATMAN CENTRAL
- ALL BATMAN DVDS
- UP TO 40% OFF THE FEATURE FILMS
- HEIR TO THE COWL: WHERE HAVE I SEEN CHRISTIAN BALE?
- OUR BATMAN COMIC BOOK PRIMER

COMING SOON
REMINGTON STEELE – SEASON 1
(JULY 26)
THE MARY TYLER MOORE SHOW
(JULY 26)
THE DUKES OF HAZZARD
(AUGUST 2)
THE COSBY SHOW
(AUGUST 2)
THE MUPPET SHOW
(AUGUST 9)

TELEVISION CENTRAL NOW OPEN
- BEWITCHED: SEASON 1
- CHAPPELLE'S SHOW: SEASON 2
- SAVE 40% ON SEX AND THE CITY DVDS
- SEE OUR NEW STORE

PATTERN NAME
PICTURE
DESCRIPTION TITLE
SUBDESCRIPTION A
SUBDESCRIPTION B
SUBDESCRIPTION C

HOT FUTURE RELEASES
COOL DVDS ON THE HORIZON
JUNE 28
- LA FEMME NIKITA – THE COMPLETE THIRD SEASON
- THE DAILY SHOW WITH JON STEWART – INDECISION 2004
- THE PACIFIER (WIDESCREEN EDITION)
JULY 5

COMPARATIVELY CRAWLING WEB PAGE DATA RECORDS RELATIVE TO A TEMPLATE

BACKGROUND

Web pages on the World Wide Web are becoming more complex to accommodate rapidly growing information needs. For example, many web pages contain a variety of information such as headline news, sports scores, market information, shopping information, and entertainment news. Much of the information displayed on these web pages may not be modified by users as most web pages use fixed templates to position and display the information at various locations on the web page. The information to be displayed in the various web pages is stored in relational databases before being presented as human-readable HTML documents. Mining this information to determine the underlying structure is helpful for use in searching other data records or web pages for similar information.

Currently, two techniques exist to search data records of web pages to reveal the underlying structure. The first technique consists of programming a tool to search a given web page or web site according to a pattern observed by a programmer. This technique requires a lot of user effort and is very difficult to scale to a large number of web pages from different domains. The second existing technique to search data records of web pages involves the automatic extraction of data records via search engines or programs. This technique suffers from numerous problems including unsatisfactory accuracy. Additionally, the automatic extraction technique must share the same schema while different applications based on these data record need different schemas.

SUMMARY

This summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various aspects of the invention provide an interactive method to search web pages containing data records. The interactive method enables users to obtain accurate results with minimal effort based on the selected user criteria.

In an aspect of the invention, a template is created for use in searching data records of web pages. Through some interactions, users may identify records of interest by selecting web blocks. The selected web blocks may represent and define the particular schema the user wants to extract. Based on the selected web blocks, a template may be automatically generated. In another aspect of the invention, a user may refine the generated template. A tree matching algorithm may be used to extract data records from a Document Object Model (DOM) tree. The matching algorithm may consider both structural information as well as contextual information. The matching algorithm may match a sub-tree to a pattern tree generated by the user.

In yet another aspect of the invention, various data records of web pages may be partitioned into web blocks. Users may collect various web blocks from different web pages to form a template that may be used to search additional web pages. A learning process and matching algorithm may be utilized to determine similarities between sub-trees.

These and other advantages will become apparent from the following detailed description when taken in conjunction with the drawings. In addition, numerous other aspects of the invention, modifications, and variations within the scope and spirit of the appended claims will occur to persons of ordinary skill in the art from a review of this disclosure.

DETAILED DESCRIPTION

Figure 1:
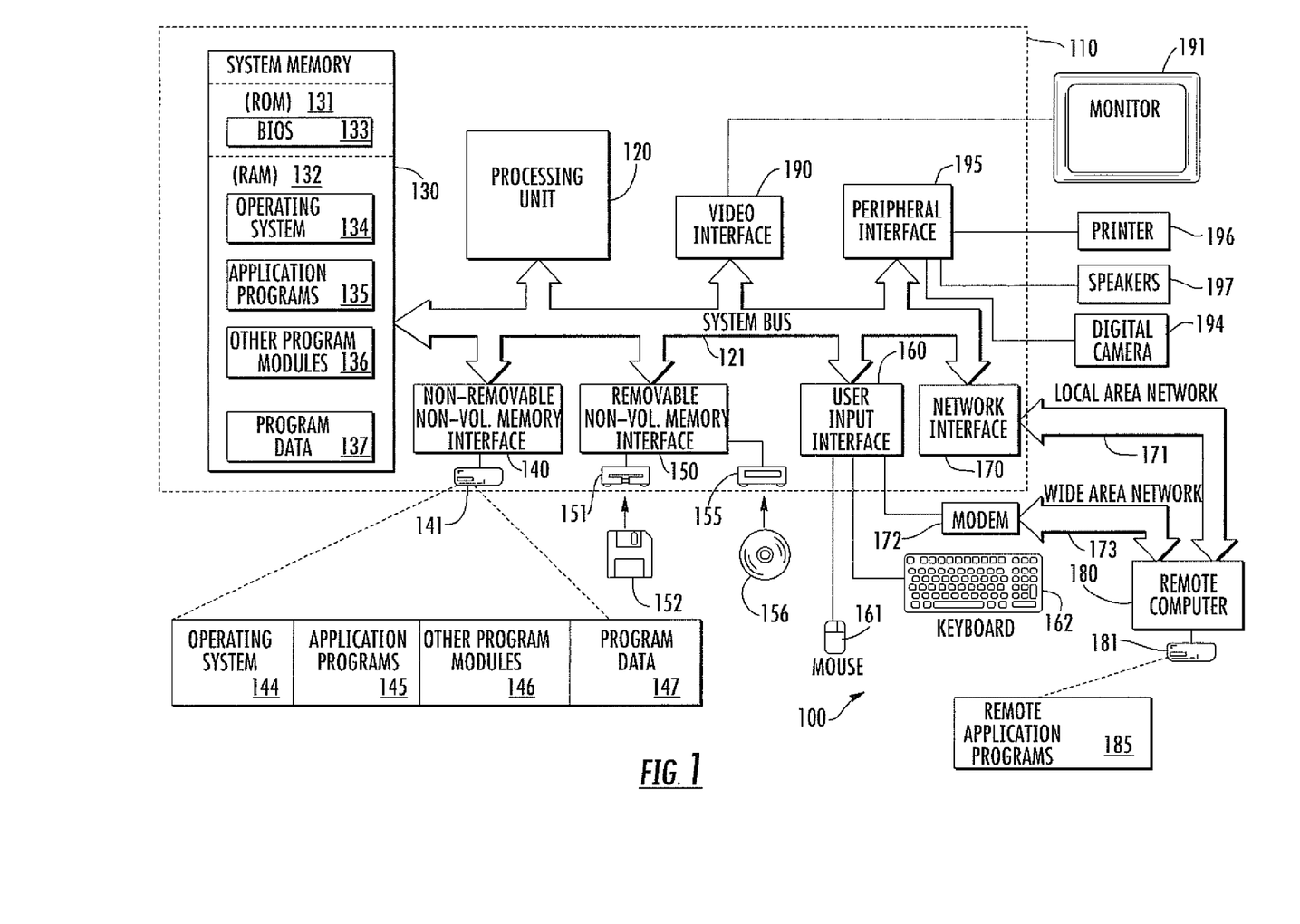
FIG. 1 illustrates an example of a suitable computing system environment on which the invention may be implemented.

FIG. 1 illustrates an example of a suitable computing system environment 100 on which the invention may be implemented. Computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media include volatile and nonvolatile, removable and non-removable media implemented in any method or technology for storage of information such as computer readable instructions, data structures, program modules or other data. Computer storage media includes, but is not limited to, RAM, ROM, EPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and wireless pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. A peripheral interface 195 may interface to a video input device such as a scanner (not shown) or a digital camera 194, where output peripheral interface may support a standardized interface, including a universal serial bus (USB) interface.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
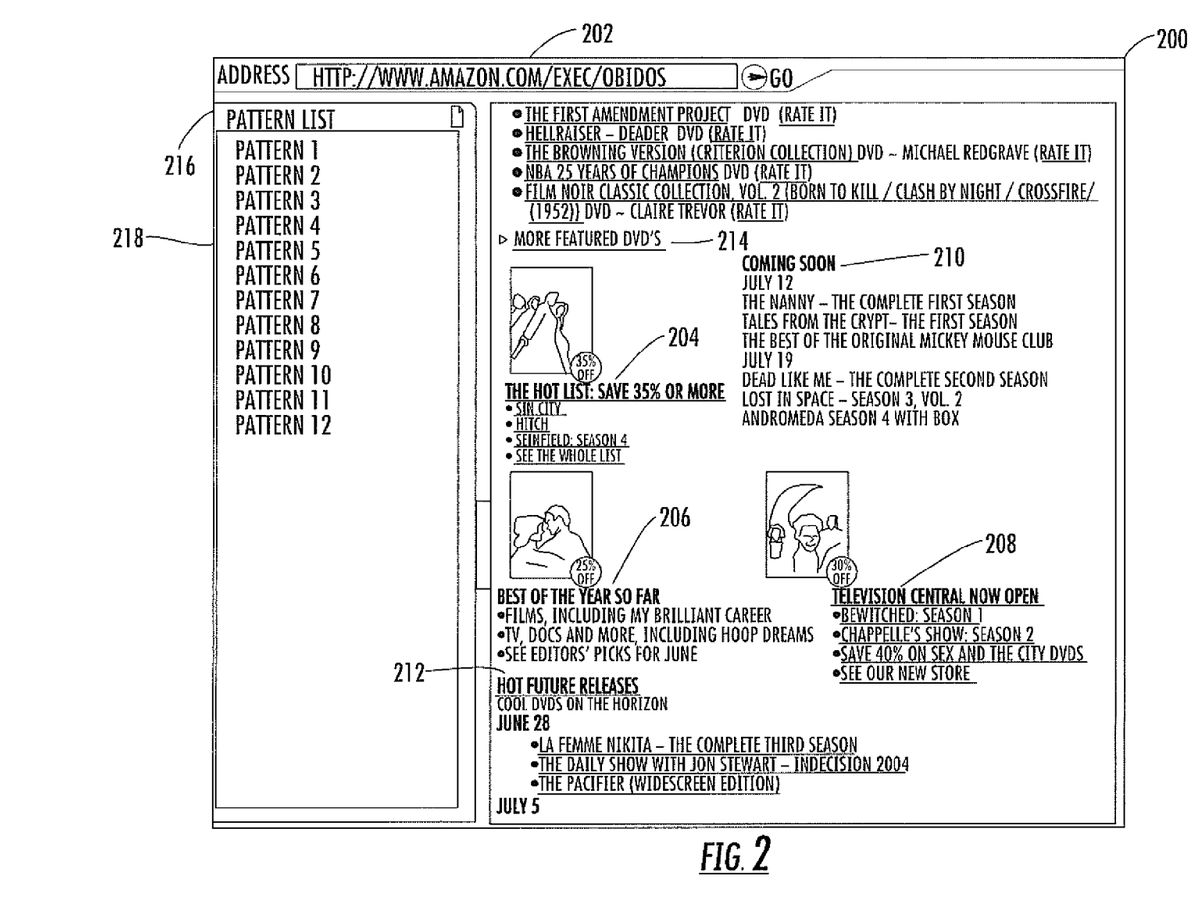
FIG. 2 illustrates a web page selected by a user in accordance with an aspect of the invention.

FIG. 2 illustrates a web page having data records of interest to a user in accordance with an aspect of the invention. In FIG. 2, a web browser 200 such as Microsoft®Internet Explorer® is utilized to display information. Web browser 200 is shown in FIG. 2 displaying an amazon.com® web page 202. The amazon.com® web page 202 may be comprised of various data records of information which may be selected. For instance, FIG. 2 illustrates various data records of information relating to the purchase of various DVDs. The data records of web page 202 may concern the purchasing of DVDs and may be organized into categories of DVDs such as "The Hot List" 204, "Best of the Year So Far" 206, "Television Central Now Open" 208, "Coming Soon" 210, "Hot Future Releases" 212, and "More Featured DVDs" 214. Each of these categories of DVDs may include a number of DVDs of interest to the user for purchase. Those skilled in the art will realize that numerous additional data records may be displayed on web page 202 and that those shown in FIG. 2 are only meant to be exemplary.

Each of the displayed categories on web page 202 may be partitioned into individual web blocks of data which represent information units. For example, a user may be interested in data records similar to one of the data records displayed in web page 202. The user may wish to search for similar data records on the current web page or on different web pages for data records containing a similar structure. For example, the user may be interested in a data record such as the data record represented by the category of information named "Best of the Year So Far" 206.

Figure 3:
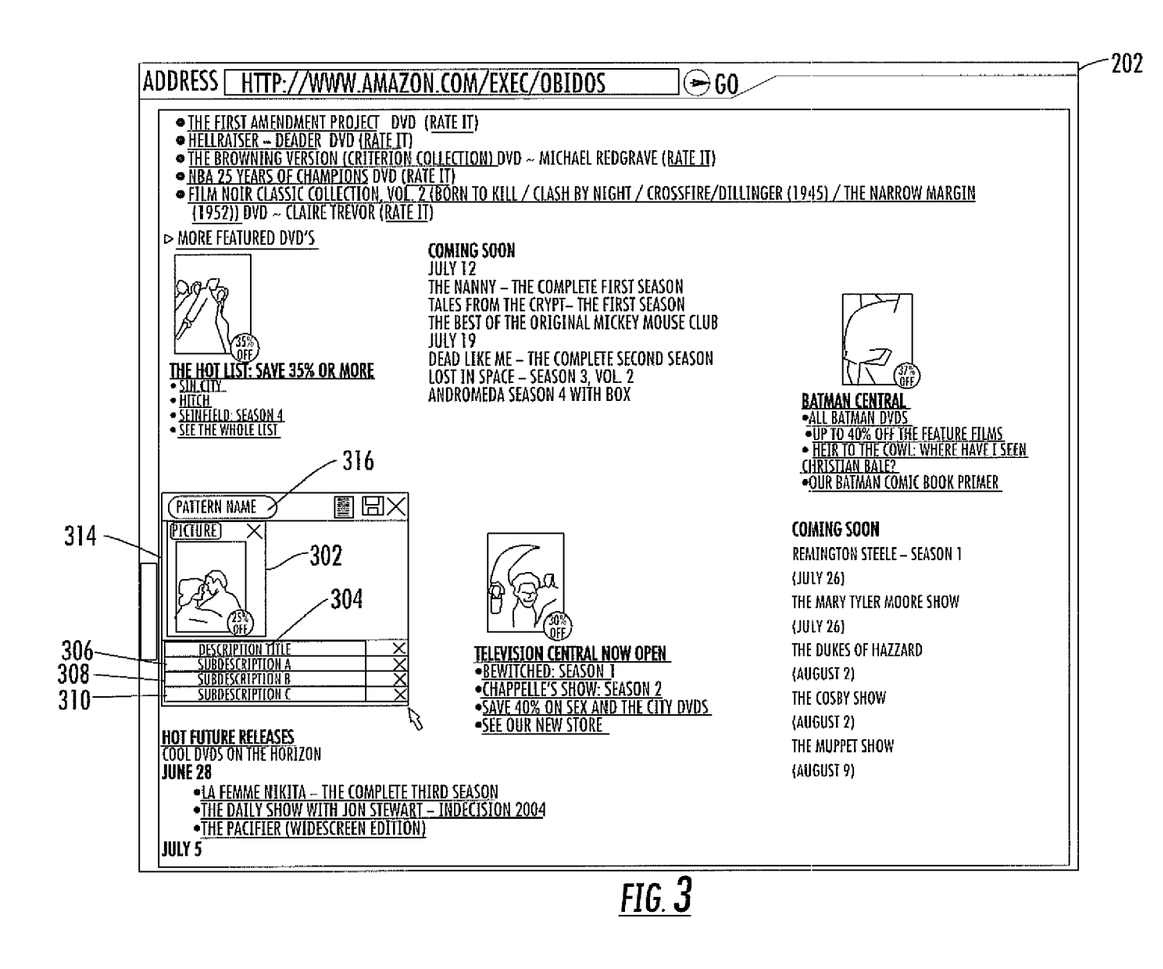
FIG. 3 illustrates the selection of data records by a user in accordance with an aspect of the invention.

In an aspect of the invention, the user may define a web block to contain a data record such as the data record "Best of the Year So Far" 206. As shown in FIG. 3, the "Best of the Year So Far" 206 data record includes a particular structure having a "Picture" 302, a "Description Title" 304, and three lines of subdescription namely "subdescription A" 306, "subdescription B" 308, and "subdescription C" 310. The user may define data record "Best of the Year So Far" 206 as a web block 314 by selecting the information using a wireless pointing device such as wireless pointing device 161 of FIG. 1. Moreover, a mouse wheel may be used to adjust the size the web block. Those skilled in the art will realize that other selection devices may be utilized to highlight the portion of material which will define a web block 314.

The defined web block 314 may be given a name such as pattern name 316. Defined web block 314 as well as other created web blocks may be stored for future use in searching as illustrated in FIG. 2 by pattern list 216. As shown in FIG. 2, pattern list 216 may include twelve web blocks 218 named patterns 1-12.

Based on the user selected data records of interest, the underlying schema may be defined and extracted. A template may be automatically generated for use in future searching of the same web page or other web pages having data records with similar content. For example, after the user has defined web block 314, the underlying schema may be defined and extracted. A template 401 (FIG. 4) may be generated to further search web page 202 for additional data records similar to the user selected data record.

Figure 4:
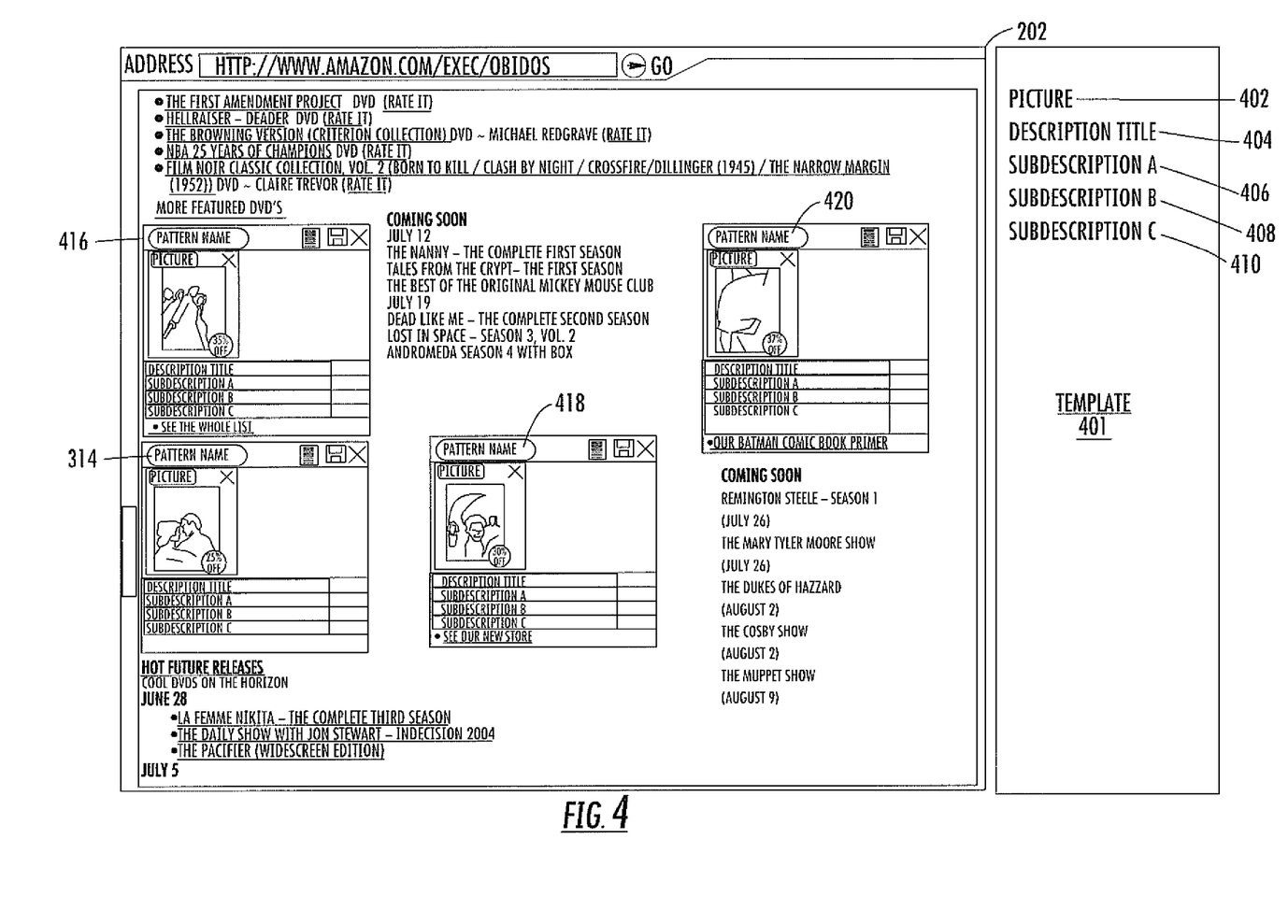
FIG. 4 illustrates search results based on the selected data records and generated template in accordance with an aspect of the invention.

FIG. 4 illustrates use of generated template 401 to search web page 202 for similar data records. The matching algorithm is described later in the specification. Template 401 may include search criteria including picture 402, "Description Title" 404, "subdescription A" 406, "subdescription B" 408, and "subdescription C" 410. After execution of the search based on generated template 401, three additional data records matching the search criteria are discovered. These three data records include data records 416, 418, and 420. Each of data records 416, 418, and 420 match the criteria as defined in generated template 401.

Figure 5:
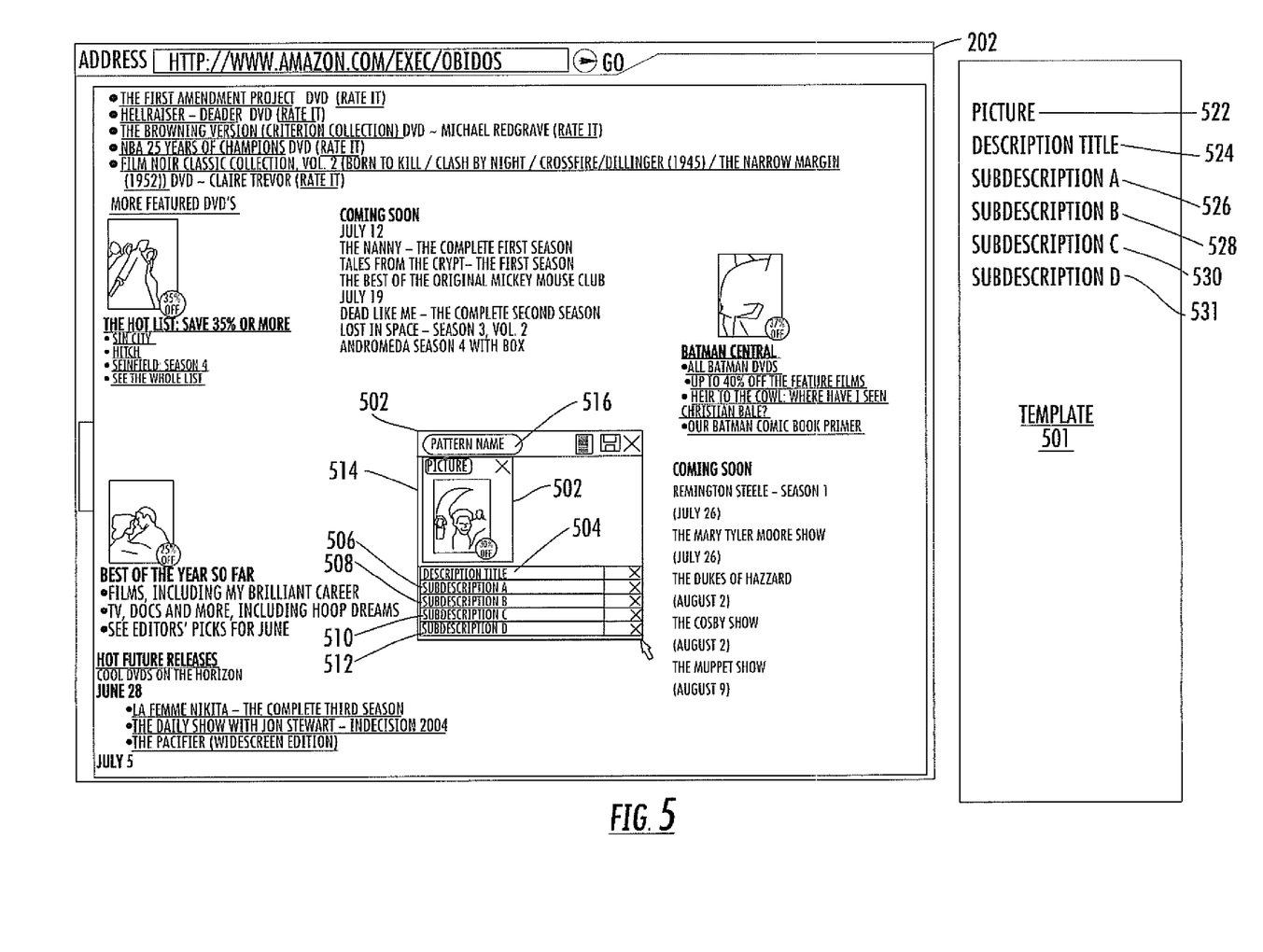
FIG. 5 illustrates editing of the selected criteria by a user to refine the template in accordance with an aspect of the invention.

In another aspect of the invention, a user may refine the generated template. For instance, in FIG. 5 a user may refine a template to contain a data record such as data record 502. As shown in FIG. 5, data record 502 includes a particular structure having a "Picture" 502, a "Description Title" 504, and four lines of subdescription namely "subdescription A" 506, "subdescription B" 508, "subdescription C" 510, and "subdescription D" 512. The user may define data record 502 as a web block 514 by selecting the information using a selection device such as mouse or key pad. Moreover, a mouse wheel may be used to adjust the size the web block. Those skilled in the art will realize that other selection devices such as wireless pointing device 161 may be utilized to highlight the portion of material which will define a web block 514. Web block 514 may be given a new or updated pattern name such as pattern name 516.

Figure 6:
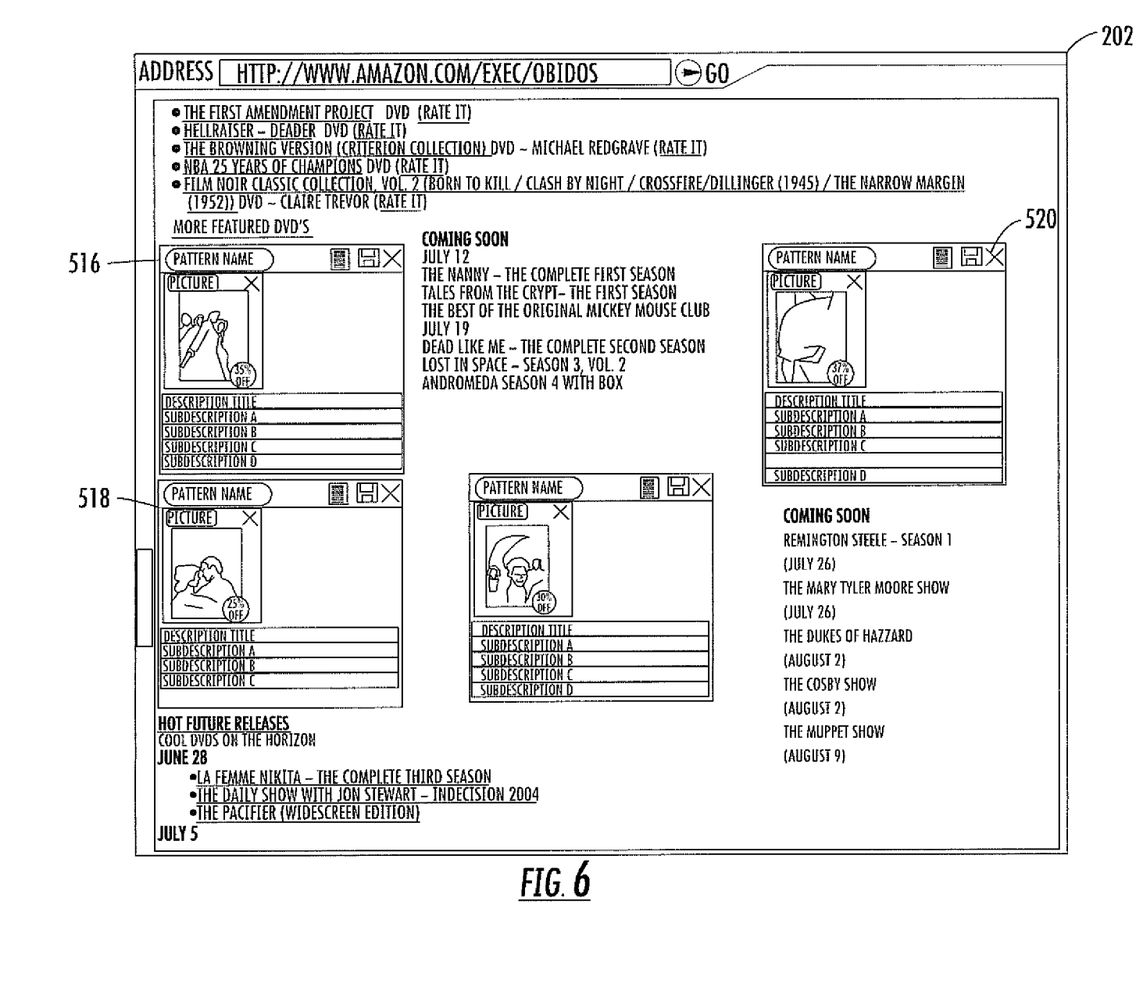
FIG. 6 illustrates search results based on the refined template in accordance with an aspect of the invention.

Based on the user selected data records of interest, the underlying schema may be defined and extracted. A template may be automatically generated for use in future searching of the same web page or other web pages having data records with similar content. Therefore, in the current illustrative example, the template may be refined so that the search criterion contains three or four lines of subdescription. For example, after the user has defined web block 514, the underlying schema may be defined and extracted. A template 501 may be generated to further search web page 202 for additional data records similar to the user selected data record. Template 501 may include search criteria including picture 522, "Description Title" 524, "subdescription A" 526, "subdescription B" 528, "subdescription C" 530, and "subdescription D" 531. After execution of the search based on generated template 501, three additional data records matching the search criteria are discovered as illustrated in FIG. 6. These three data records include data records 516, 518, and 520. Each of data records 516, 518, and 520 match the criteria as defined in generated template 501.

Figure 7:
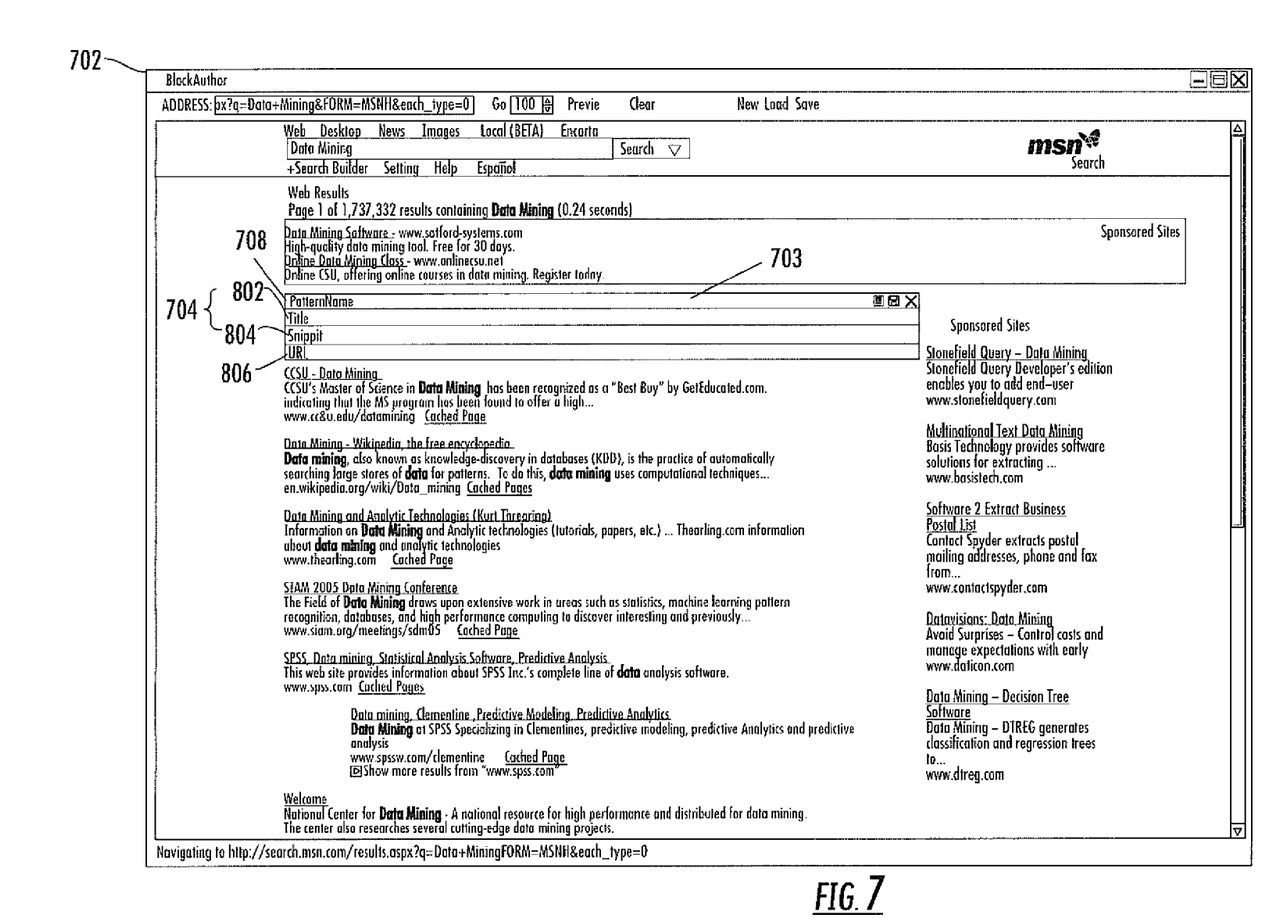
FIG. 7 illustrates selection of another web page and associated data records in accordance with an aspect of the invention.
Figure 8:
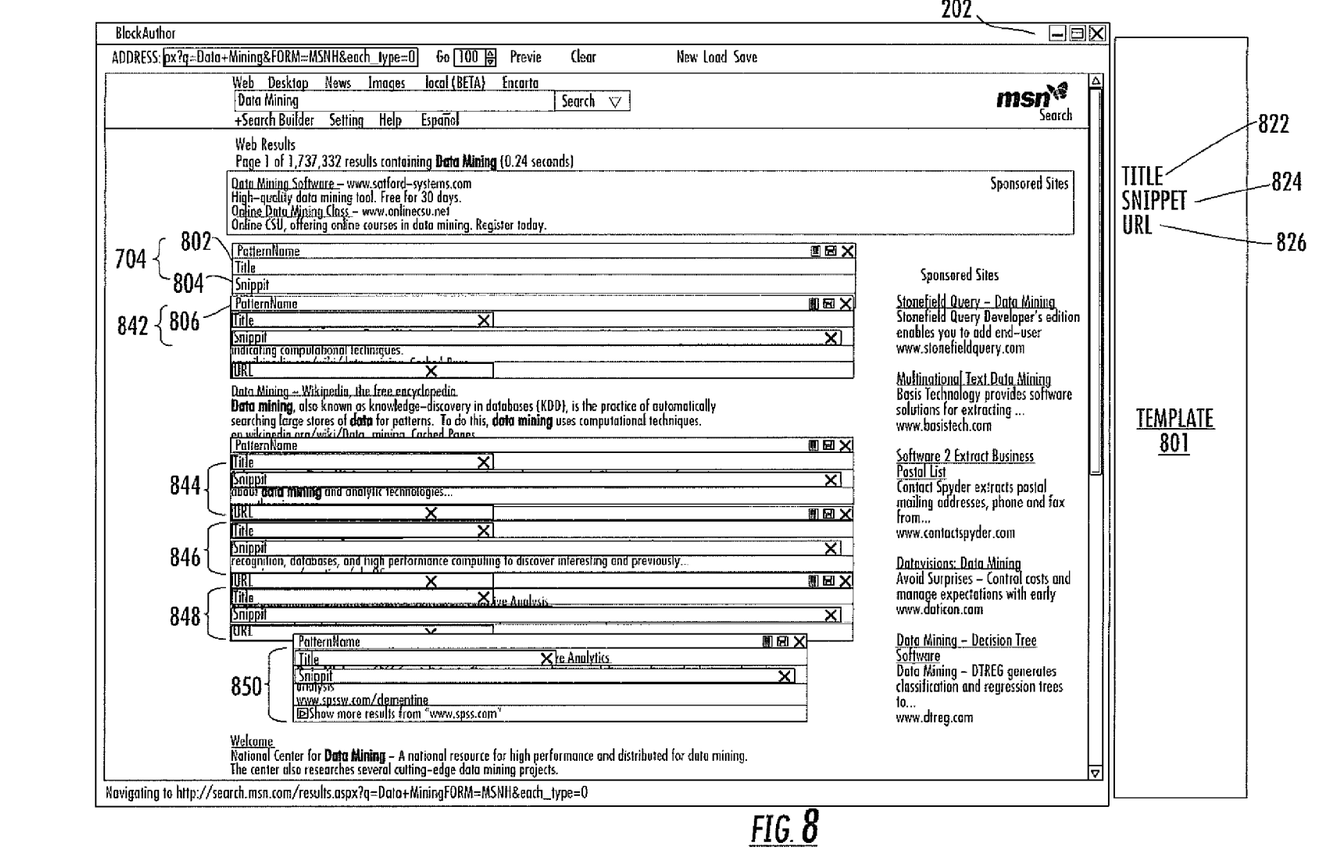
FIG. 8 illustrates search results based on the selected data records of FIG. 7 in accordance with an aspect of the invention.

As another example, a user interested in data mining information may use a search engine such as the msn® search engine to find subject matter information. An exemplary search for data mining information is illustrated in FIG. 7 in web page 702. In an aspect of the invention, the user may define a web block to contain information listed in a data record such as the data record listed as the first listing of web page 702. The first data record listing 703 in the data mining search results is information from Wikipedia® concerning the definition of data mining. The user may define data record 703 as a web block 704 by selecting the information using a selection device such as wireless pointing device 161. Moreover, a mouse wheel may be used to adjust the size the web block. Those skilled in the art will realize that other selection devices may be utilized to highlight the portion of material which will define web block 704. The defined web block 704 may include a structure having a title 802, snippet information snippet 804, and a URL 806.

The defined web block 704 may be given a name such as a pattern name as illustrated at 708. Defined web block 704 as well as other created web blocks may be stored for future use in searching. Based on the user selected data record 703, an underlying schema may be defined and extracted. A template may be automatically generated for use in future searching of the same web page or other web pages having data records with similar content. For example, after the user has defined web block 704, the underlying schema may be defined and extracted. A template 801 may be generated to further search web page 702 for additional data records similar to the user selected data record.

FIG. 8 illustrates the use of generated template 801 to search web page 802 for similar data records. Discussion of the matching algorithm is discussed later in the specification. Template 801 may include search criteria including "Title" 822, "Snippet" 824, and "URL" 826. After execution of the search based on generated template 801, at least five additional data records matching the search criteria are discovered as illustrated in FIG. 8. These five data records include data records 842-850. Each of data records 842-850 match the criteria as defined in generated template 801.

The interactive template generation approach is designed for users to easily create a data record template. In an aspect of the invention, users need not review the page source code to identify information of interest.

In another aspect of the invention, a DOM tree matching algorithm may be used to compare and extract matching data records. A learning process may be used to learn the features of the user-defined schema. From both the positive and negative instances given by users, some base learners may learn the schema features, including text features, image features, numerical features, etc. . . . Based on these features, similarities between two sub-trees may be calculated. This type of comparison between features may be called node element similarity. In addition to node element similarity, structure similarity of the two sub-trees may also be considered to improve search accuracy. To calculate the similarity of the schema S and a sub-tree T, a matching algorithm and a distance function "dis" may be used. The matching algorithm may be used to identify all similar sub-trees in the entire DOM tree structure. As those skilled in the art will realize, sub-tree structures are relatively stable factors that may be compared without user feedback.

The sub-tree matching method and a learning method are disclosed as follows:

Definition 1—A labeled Tree is a tree with a label l attached to each of it nodes. A DOM tree of web pages can be transformed into a labeled tree by adopting the tags as labels.

Definition 2—Let $T[i]$ be the $i^{th}$ node of labeled tree T in a preorder walk. Let $l[r]$ be the label of node r. A mapping M between a labeled tree T of size $n_1$ and a labeled tree T' of size $n_2$ is a set of pairs (i, j), one from each tree, satisfying the following conditions for all $(i_1, j_1), (i_2, j_2) \in M$:

$$i_1 = i_2 \text{ if } j_1 = j_2; \tag{1}$$

$$T[i_1] \text{ is an ancestor of } T[i_2] \text{ if } T'[j_1] \text{ is an ancestor of } T'[j_2]. \tag{2}$$

$$l[T[i_1]] = l[T'[j_1]], l[T[i_2]] = l[T'[j_2]] \tag{3}$$

In an embodiment, numerous mappings may exist between the two labeled trees. Therefore, to evaluate the mapping quality, an edit distance may be utilized.

Definition 3—The edit distance between two trees T and T' is the number of unmapped nodes in the two trees. Edit distance may reflect the cost associated with the minimal set of operations needed to transform T into T'. By finding a mapping with minimum edit distance, an evolved block may be attained.

Definition 4—An ordered tree may be a tree with children of each node ordered.

Definition 5—Let $T[i]$ be the $i^{th}$ node of ordered labeled tree T in a preorder walk. Let $l[r]$ be the label of node r. A mapping M between an ordered labeled tree T of size $n_1$ and an ordered labeled tree T' of size $n_2$ is a set of pairs (i, j), one from each tree, satisfying the following conditions for all $(i_1, i_2), (i_2, j_2) \in M$:

$$i_1 = i_2 \text{ if } i_2 = j_2; \tag{1}$$

$$T[i_1] \text{ is an ancestor of } T[i_2] \text{ if } T'[i_2] \text{ is an ancestor of } T'[j_2]. \tag{2}$$

$$l[T[i_1]] = l[T'[j_1]], l[T[i_2]] = l[T'[j_2]] \tag{3}$$

$$T[i_1] \text{ is on the left of } T[i_2] \text{ if } T'[i_2] \text{ is on the left } T'[j_2]; \tag{4}$$

Intuitively, the definition may require that each node to appear no more than once in a mapping. The order between sibling nodes and the hierarchical relation between nodes may also be preserved.

As stated above, a web page may be parsed into a DOM tree. A defined web block may be viewed as a sub-tree of the parsed DOM tree. Because the web block may be viewed as a sub-tree, the matching problem may be illustrated as given a DOM tree T and its sub-tree S, when T has evolved to a DOM tree T', which sub-tree S' in 'T is corresponding to S. Given two trees T and T', let r and r' are their root nodes respectively. $n(T'')$ stands for the number of nodes in T'', where T'' can be T or T', or any sub-tree of them. The difference of T and T' is defined as $Diff(T, T')$. The edit distance may be accumulated by the number of unmapped nodes recursively in the two trees as follows:

1) All nodes in T are not mapped to a node in T', then $$Diff(T,T') = n(T) + n(T').$$

Intuitively, the edit distance of unmapped sub-trees may be the number of the nodes.

2) If r is mapped to r', the distance is the total number of two trees minus the matched nodes. Assume that pi and pi' are monotonously increasing so that a standard dynamic programming algorithm may be used to calculate the mapping with minimum edit distance. Assume that there are m pairs of sub-trees, then $$Diff(T, T') = n(T) + n(T') - 2 - \sum_{0 \le i < m} n(S_{pi}) + n(S'_{pi'}) - Diff(S_{pi}, S'_{pi'})$$

3) If r is mapped to the root node s' of sub-tree S' in T', the edit distance of the two trees is the edit distance T and S' in addition with the unmatched nodes T' as shown by:

$$Diff(T,T') = n(T') - n(S') + Diff(T,S')$$

The edit difference $Diff(T,T')$ is recursively defined. In the second condition, we assume that pi and pi' are monotonously increasing, so that the equations may be used to calculate the minimum difference. After calculating the mapping, when given the tracked for a given sub-tree S in the tree T, we can give a corresponding sub-tree S', which global position in T' is similar to S's position in T. The sub-tree matching algorithm enables sub-trees of web blocks to be compared. In another aspect of the invention a learning process may be utilized to learn or discover user preferences or needs.

Figure 9:
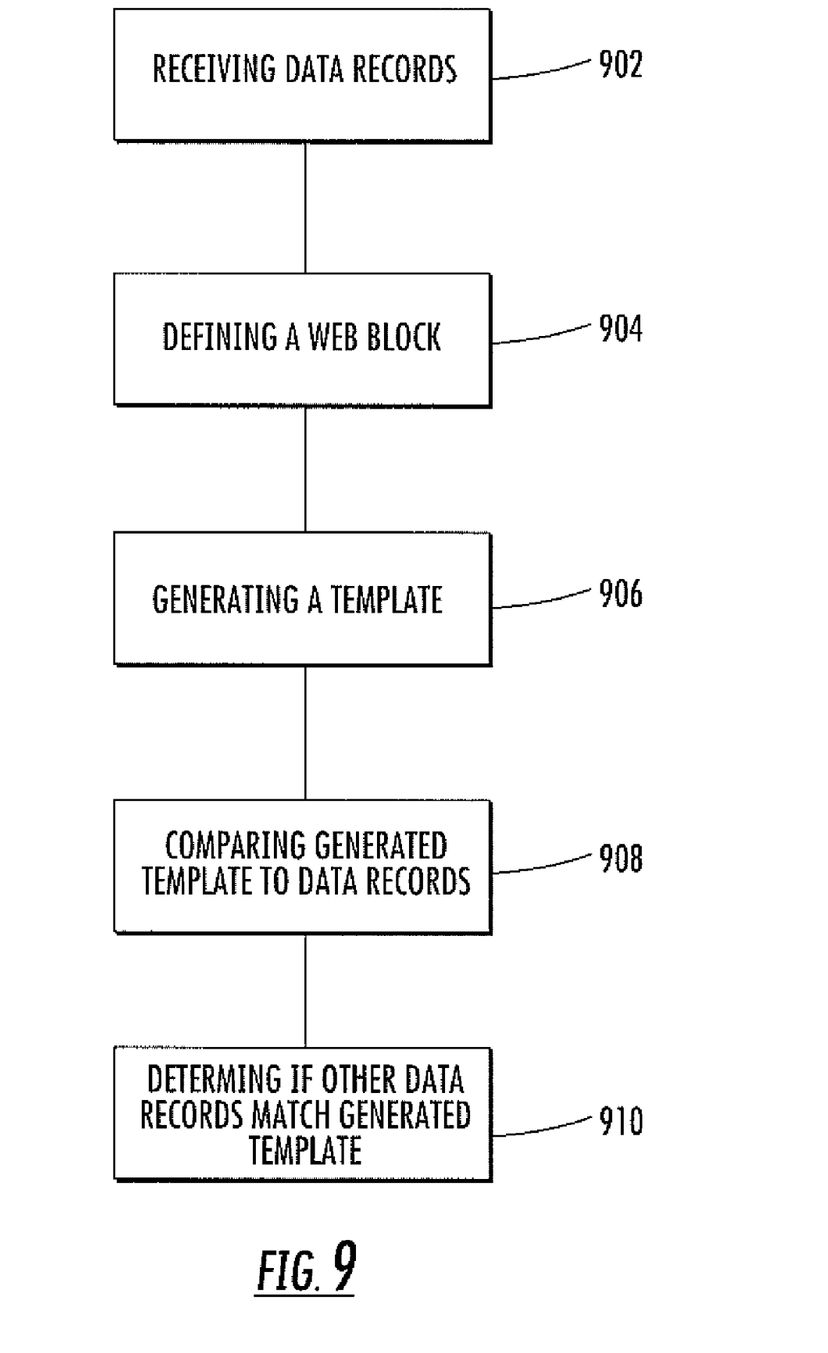
FIG. 9 illustrates a method of interactively searching data records located on web pages in accordance with an aspect of the invention.

FIG. 9 shows an illustrative method for searching data records on a web page in accordance with an aspect of invention. Referring to FIG. 9 at step 902, selected data records are received. The selection may be made by a user using a pointing device such as a mouse or keypad. The user may select data records for containing information or format of interest to the user. Next, in step 904 a web block may be defined based on the selected information. Furthermore, in step 906 a template may be generated based on the defined web block. The generated template may be saved for future searching functions.

In step 908, other data records located on the same web page or on other web pages may be compared with the template. Finally, in step 910 it may be determined if other data records match the generated template.

While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

What is claimed is:

1. A method of searching data records on a web page, the method comprising:
   storing, in a memory, instructions for performing the method of searching data records on a web page;
   executing the instructions on a processor;
   according to the instructions being executed:
   receiving data records selected by a user from a displayed web page;
   defining a web block based on the data records that were selected by the user, wherein the web block represents search criteria to be used to identify a similar web block of data records on another web page;
   generating a structure template based on the defined web block, wherein the structure template represents an underlying schema of the web block;
   comparing the generated structure template to a structure of other data records displayed on another web page; and
   determining if the structure of the other data records matches the generated template, wherein the determining if other data records match the generated template comprises calculating a minimum difference using an equation, $$Diff(T, T') = n(T) + n(T') - 2 - \sum_{0 \leq i < m} n(S_{pi}) + n(S'_{pi'}) - Diff(S_{pi}, S'_{pi'})$$

wherein:
the generated template, T is a Document Object Model (DOM) tree template based on the defined web block;
T' is a DOM tree of the other data records;
n(T) is a number of nodes in T;
n(T') is a number of nodes in T';
m is a number of pairs of corresponding sub-trees in T and T';
Spi is a sub-tree of T;
Spi' is a sub-tree of T';
n(Spi) is a number of nodes in Spi; and
n(Spi') is a number of nodes in Spi'
Diff (T, T'') is recursively defined to be the edit distance between T and T';
Diff($S_{pi}$, $S'_{pi}$') is recursively defined to be the edit distance between $S_{pi}$ and $S'_{pi}$'.

2. The method of claim 1, wherein the defining a web block comprises incorporating the received data records into a Document Object Model (DOM) tree structure.

3. The method of claim 1, wherein the web page comprises hypertext mark-up language.

4. The method of claim 1, wherein the first DOM tree is associated with the generated template and the second DOM tree is associated with the other data records.

5. A computer-readable storage medium encoded with computer-executable instructions that, when executed, direct a computing system to perform a method, the method comprising:
   receiving data records selected from a displayed web page, the received data records including a user's selection of the data records;
   defining a web block based on the received data records that were selected by the user, wherein the web block represents search criteria to be used to identify a similar web block of data records on another web page;
   generating a structure template based on the defined web block, wherein the structure template represents an underlying schema of the web block; and
   extracting a structure of other data records from the web page based on the generated template, wherein the extracting the other data records from the web page comprises calculating a minimum difference using the equation $$Diff(T, T') = n(T) + n(T') - 2 - \sum_{0 \leq i < m} n(S_{pi}) + n(S'_{pi'}) - Diff(S_{pi}, S'_{pi'}),$$

wherein:
T is a Document Object Model (DOM) tree template based on the defined web block;
T' is a DOM tree of the other data records;
n(T) is a number of nodes in T;
n(T') is a number of nodes in T';
m is a number of pairs of corresponding sub-trees in T and T';
Spi is a sub-tree of T;
Spi' is a sub-tree of T';
n(Spi) is a number of nodes in Spi; and
n(Spi') is a number of nodes in Spi'
Diff (T, T'') is recursively defined to be the edit distance between T and T';
Diff($S_{pi}$, $S'_{pi}$') is recursively defined to be the edit distance between $S_{pi}$ and $S'_{pi}$'.

6. The computer-readable storage medium of claim 5, wherein the defining a web block comprises incorporating the received data records into a first Document Object Model (DOM) tree structure.

7. The computer-readable storage medium of claim 5, wherein the method further comprises a learning process to learn features of an underlying schema of the defined web block.

8. A method of interactively crawling a web page, the method comprising:
   storing, in a memory, instructions for performing the method of interactively crawling a web page;
   executing the instructions on a processor;
   according to the instructions being executed:
   defining a web block based on a plurality of data records selected by a user from a displayed web page, wherein the web block represents search criteria to be used to identify a similar web block of data records on another web page;
   generating a structure template based on the defined web block, wherein the structure template represents an underlying schema of the web block;

comparing the generated structure template to a structure of other information displayed on the web page; and determining if the structure of the other data records match the generated template, wherein the determining if other data records match the generated template comprises calculating a minimum difference using an equation, $$Diff(T, T') = n(T) + n(T') - 2 - \sum_{0 \le i < m} n(S_{pi}) + n(S'_{pi'}) - Diff(S_{pi}, S'_{pi'})$$

wherein:

the generated template, T is a Document Object Model (DOM) tree template based on the defined web block;

T' is a DOM tree of the other data records;

n(T) is a number of nodes in T;

n(T') is a number of nodes in T';

m is a number of pairs of corresponding sub-trees in T and T';

Spi is a sub-tree of T;

Spi' is a sub-tree of T';

n(Spi) is a number of nodes in Spi; and n(Spi') is a number of nodes in Spi'

Diff (T, T") is recursively defined to be the edit distance between T and T';

Diff($S_{pi}$, $S'_{pi}$') is recursively defined to be the edit distance between $S_{pi}$ and $S_{pi}$'.

9. The method of claim 8, wherein the defining a web block comprises incorporating data included in the web block into a Document Object Model (DOM) tree structure.

10. The method of claim 8, wherein the first DOM tree is associated with the generated template.

11. The method of claim 8, wherein the second DOM tree is associated with the other data records.

* * * * *